US009262569B2

(12) United States Patent
Bickford et al.

(10) Patent No.: US 9,262,569 B2
(45) Date of Patent: Feb. 16, 2016

(54) BALANCING SENSITIVITIES WITH RESPECT TO TIMING CLOSURE FOR INTEGRATED CIRCUITS

(71) Applicant: INTERNATIONAL BUSINESS MACHINES CORPORATION, Armonk, NY (US)

(72) Inventors: Jeanne P. Bickford, Essex Junction, VT (US); Eric A. Foreman, Fairfax, VT (US); David J. Hathaway, Underhill, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 200 days.

(21) Appl. No.: 14/185,079

(22) Filed: Feb. 20, 2014

(65) Prior Publication Data

US 2015/0234969 A1  Aug. 20, 2015

(51) Int. Cl.
*G06F 17/50* (2006.01)

(52) U.S. Cl.
CPC ........ *G06F 17/5068* (2013.01); *G06F 2217/84* (2013.01)

(58) Field of Classification Search
CPC ................ G06F 17/5031; G06F 2217/84
USPC .......................................... 716/136
See application file for complete search history.

(56) References Cited

U.S. PATENT DOCUMENTS

| 5,600,274 | A * | 2/1997 | Houston ................ 327/262 |
| 7,006,939 | B2 | 2/2006 | Voorakaranam et al. |
| 7,460,922 | B1 | 12/2008 | Singh et al. |
| 7,970,468 | B1 * | 6/2011 | Ostrow ................ 607/14 |
| 8,286,111 | B2 | 10/2012 | Chandra et al. |
| 8,286,112 | B2 | 10/2012 | Miranda et al. |
| 8,307,317 | B2 | 11/2012 | Adams et al. |
| 8,336,010 | B1 | 12/2012 | Chang et al. |
| 2009/0288051 | A1 * | 11/2009 | Hemmett et al. ......... 716/6 |
| 2010/0293512 | A1 * | 11/2010 | Buck et al. ............. 716/2 |
| 2013/0014073 | A1 | 1/2013 | Gupta et al. |

OTHER PUBLICATIONS

Douglas A. Dallmann et al., "Scaling Constraints Imposed by Self-Heating in Submicron SOI MOSFETs", 1995 IEEE, 8 pages.

(Continued)

*Primary Examiner* — Suchin Parihar
(74) *Attorney, Agent, or Firm* — David Cain; Andrew M. Calderon; Roberts Mlotkowski Safran & Cole, P.C.

(57) ABSTRACT

Systems and methods for improving timing closure of new and existing semiconductor products by balancing sensitivities. More specifically, a method is provided for that includes defining at least one set of correlated parameters for a semiconductor product, the at least one set of correlated parameters comprising a first parameter and a second parameter. The method further includes measuring performance of embedded devices within the semiconductor product. The method further includes closing timing of the semiconductor product using the measured performance of the semiconductor product. The closing the timing of the semiconductor product comprises calculating a sensitivity to the first parameter based on the measured performance of the embedded devices within the semiconductor product and balancing the sensitivity to the first parameter with a sensitivity to a second parameter such that timing degradation is shifted from the first parameter to the second parameter.

20 Claims, 5 Drawing Sheets

(56) References Cited

OTHER PUBLICATIONS

M. Jagadesh Kumar et al., "Investigation of a new modified source/drain for diminished self-heating effects in nanoscale MOSFETs using computer simulation", Department of Electrical Engineering, Indian Institute of Technology, New Delhi, India, 2006, 5 pages.

Agarwal et al., "Circuit Optimization Using Statistical Static Timing Analysis", DAC 2005, 4 pages.

Majid Babazadeh et al., "First Look at Across-chip Performance Variation Using Non-Contact, Performance-Based Metrology", Dept of Electrical Engineering and Computer Science, May 2002, 6 pages.

Sharad Saxena et al., "Variation in Transistor Performance and Leakage in Nanometer-Scale Technologies", IEEE Transactions on Electron Devices, vol. 55 No. 1, Jan. 2008, 14 pages.

Dunsmoor et al.,"Applications and Use of Stage-Based OCV" http://www.eetimes.com/General/PrintView/4373361, May 2012, 10 pages.

Bickford et al.,"Semiconductor Timing Improvement", U.S. Appl. No. 13/683,228, filed Nov. 21, 2012, 34 pp.

* cited by examiner

BALANCING SENSITIVITIES WITH RESPECT TO TIMING CLOSURE FOR INTEGRATED CIRCUITS

FIELD OF THE INVENTION

The invention relates to systems and methods for integrated circuit ("IC") fabrication and optimization and, more particularly, to systems and methods for improving timing closure of new and existing semiconductor products by balancing sensitivities.

BACKGROUND

The layout of an IC must not only satisfy geometric requirements, e.g., non-overlapping cells and routability, but also meet the design's timing constraints, e.g., setup (long-path) and hold (short-path) constraints. The optimization process that meets these requirements and constraints is often called timing closure. However, with each semiconductor process node, the impacts on performance of environmental and semiconductor process variations become a larger portion of the cycle time of the product and impacts timing closure for the product.

More specifically, the environmental and semiconductor process variations include correlated or systematic variation, which is the same across all die, wafers, or lots, and uncorrelated or random variation, which is different from die to die, wafer to wafer, and lot to lot. The amount of timing (e.g., delay) degradation seen during timing closure depends on the magnitude of each variation type, i.e., systematic and random, the characterization and extraction techniques used in timing models to represent these variations, and the algorithms used by timing tools to apply these variations during timing closure. Simple guard-banding for these effects leads to increased product development times and uncompetitive products.

SUMMARY

In a first aspect of the invention, a method is provided for that is implemented in a computer infrastructure having computer executable code tangibly embodied on a computer readable storage medium having programming instructions operable to define at least one set of correlated parameters for a semiconductor product, the at least one set of correlated parameters comprising a first parameter and a second parameter. The programming instructions are further operable to measure performance of embedded devices within the semiconductor product. The programming instructions are further operable to close timing of the semiconductor product using the measured performance of the semiconductor product. The closing the timing of the semiconductor product includes calculating a sensitivity to the first parameter based on the measured performance of the embedded devices within the semiconductor product and balancing the sensitivity to the first parameter with a sensitivity to a second parameter such that timing degradation is shifted from the first parameter to the second parameter.

In another aspect of the invention, a method is provided for that includes measuring performance of embedded devices within a semiconductor product. The method further includes closing timing of the semiconductor product using the measured performance of the semiconductor product. The closing the timing of the semiconductor product includes generating a new extended canonical model comprising a sensitivity to a first parameter and a sensitivity to a second parameter that are calculated based on the measured performance of the embedded devices within the semiconductor product, and balancing the sensitivity to the first parameter with the sensitivity to the second parameter within the new extended canonical model such that timing degradation is shifted from the first parameter to the second parameter. The method further includes using the new extended canonical model to compute a pseudo-bin for the semiconductor product. The method further includes adjusting a processing bin for the semiconductor product to the pseudo-bin.

In yet another aspect of the invention, a computer program product comprising a computer readable storage medium having program instructions embodied therewith, the program instructions executable by at least one processor to cause the at least one processor to measure performance of embedded devices within a semiconductor product. The at least one processor also being caused to close timing of the semiconductor product using the measured performance of the semiconductor product. The closing the timing of the semiconductor product includes calculating a sensitivity to a first parameter based on the measured performance of the embedded devices within the semiconductor product and balancing the sensitivity to the first parameter with a sensitivity to a second parameter such that timing degradation is shifted from the first parameter to the second parameter.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention.

DETAILED DESCRIPTION

The invention relates to systems and methods for integrated circuit ("IC") fabrication and optimization and, more particularly, to systems and methods for improving timing closure of new and existing semiconductor products by balancing sensitivities. More specifically, implementations of the invention provide systems and methods for identifying at least one set of correlated parameters (e.g., parameters that may be balanced) that may influence timing closure and balancing sensitivies of the at least one set of correlated parameters with respect to the timing closure. In embodiments, the balancing of the sensitivities of the at least one set of correlated parameters may comprise measuring one of the parameters of the at least one set of correlated parameters with greater precision such that the influence of the more precise measurement is reflected in the other parameter of the at least one set of correlated parameters (e.g., timing degradation is shifted from the one parameter to the other parameter). Advantageously, the aspects of the present invention allow for lesser guard-banding and improved timing of new and existing semiconductor products.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
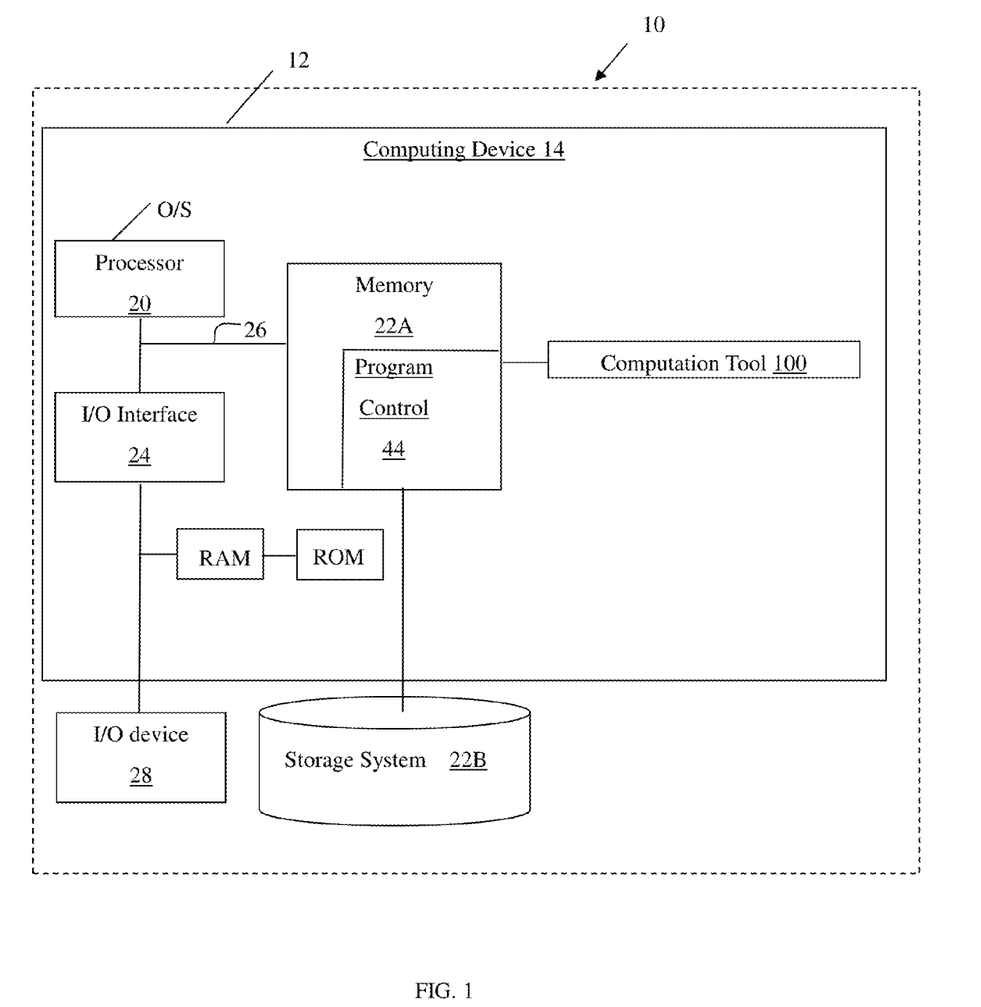
FIG. 1 is an illustrative external environment for implementing the invention in accordance with aspects of the invention.

With reference now to FIG. 1, an illustrative environment 10 is provided for managing the processes in accordance with the present invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a computation tool 100, e.g., at least a portion of an electronic design automation (EDA) application or tool, which performs the processes described herein. The computation tool 100 can be implemented as one or more program code in the program control 44 stored in memory 22A as separate or combined modules. Additionally, the computation tool 100 may be implemented as separate dedicated processors or a single or several processors to provide the function of these tools.

In embodiments, the computation tool 100 may be configured to define default sensitivities using test site performance measurement structures, time a product using the defined default sensitivities, receive or identify at least one set of correlated parameters, and time a product using new sensitivities for the at least one set of correlated parameters. In additional or alternative embodiments, the computation tool 100 may be further configured to define default sensitivities using test site performance measurement structures, time a product using the defined default sensitivities, manufacture the product, test the manufactured product, compute a pseudo-bin for the manufactured product using an extended canonical model that includes new sensitivities for at least one set of correlated parameters, and adjusting process binning for the manufactured product to the calculated pseudo-bin, as further discussed herein.

While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
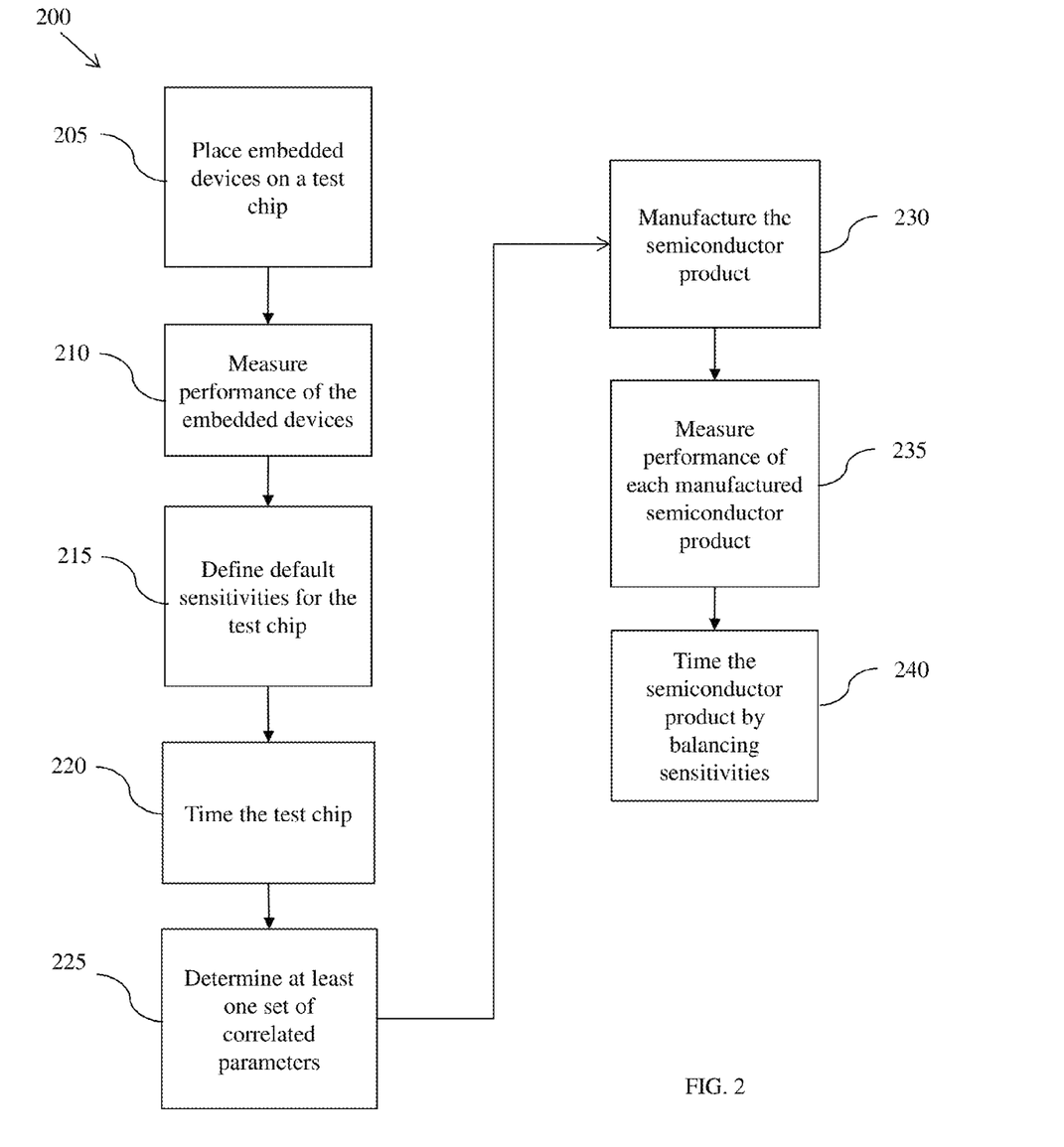
FIGS. 2 and 3 are illustrative process flows for implementing the system in accordance with aspects of the invention.

FIG. 2 shows an exemplary flow for performing aspects of the present invention. The steps of FIG. 2 may be implemented in the environment of FIG. 1, for example. As noted above, the flowchart(s) illustrate the architecture, functionality, and operation of possible implementations of systems, methods, and computer program products according to various embodiments of the present invention. In embodiments, a process 200 is provided for closing timing of a semiconductor product by balancing sensitivities for at least one set of correlated parameters.

At step 205, devices or functional patterns (e.g., embedded devices) are placed in a test chip and/or a semiconductor product (e.g., an IC chip). The embedded devices may be, for example, a hard macro placed as a regular structure across the test chip. In embodiments, the hard macro may represent performance screen ring oscillators (PSROs) that are built into the test chip and/or the semiconductor product. In embodiments, a predetermined number of PSROs may be built across the test chip and/or the semiconductor product in many different configurations, e.g., a grid pattern.

At step 210, the performance of each of the embedded devices is measured to obtain an understanding of how the embedded devices behave across the test chip and/or the semiconductor product (e.g., on-chip variation (OCV) or across chip variation (ACV)). In embodiments, the performance of each of the PSROs may be measured across the test chip and/or the semiconductor product at the time of qualification and mapped to corresponding regions of the test chip and/or the semiconductor product. For example, a relationship may be established between performances of each of the embedded devices (e.g., PSROs) and a test site performance such that performance gradients across the test chip and/or the semiconductor product summarize the affects of process variables, such as OCV, and process level densities on performance of the circuits within the test chip and/or the semiconductor product.

At step 215, default sensitivities for the test chip and/or the semiconductor product may be defined based on the measured performances of the embedded devices in the test chip. In embodiments, different performance measurements of key parameters (e.g., voltage, frequency, channel length, threshold voltage, hot-e, etc) from the multiple instances of the embedded devices on the same test chip and/or the semiconductor product are characterized to obtain an understanding or assumption of correlated and uncorrelated parameter components. The sensitivities of the correlated and uncorrelated parameter components may be defined as a measurement of variance of a distribution or a measurement of how something varies across a parameter space. For example, parameter components that have a Gaussian distribution may have their sensitivies defined as a standard deviation of a normal distribution, e.g., how much the parameter varies by one unit sigma. The default sensitivities defined in the analysis may be recorded such that the default sensitivities can be retrieved if re-analysis or optimization is required at a later time, and checked to verify that the default sensitivities actually hold when the default sensitivities are used as a part of the design of product line chips.

At step 220, the test chip and/or the semiconductor product may be timed using the defined default sensitivities. In embodiments, the timing of the product may include closing timing of the semiconductor product using static timing analysis (STA) or statistical static timing analysis (SSTA), which are techniques for computing the expected timing of a digital circuit without requiring simulation. In timing closure, the on-chip variation can be described and accounted for using the correlated and uncorrelated parameter components. The uncorrelated or random component of parameter variation occurs from lot to lot, wafer to wafer, and die to die. Examples are variations in gate-oxide thickness, implant doses, and metal or dielectric thickness. The correlated or systematic component parameter variation comprises variations that may be predicted from their location on the wafer or the nature of surrounding patterns. These variations relate to proximity effects, density effects, and the relative distance of devices. Examples are variations in gate length or width and interconnect width. To model these effects, aspects of the present invention use the default sensitivities (e.g., timing degradation factors) during STA or SSTA to specify, on a percentage basis, the speeding up or slowing down of all or specific gates, nets, or both in the design of the semiconductor product. The total timing (e.g., delay) degradation is a sum of the uncorrelated and correlated variations on a per-cell or -net basis.

At step 225, at least one set of correlated parameters may be determined and/or received. In embodiments, a designer or design tool (e.g., the computation tool 100 described with respect to FIG. 1) may determine that at least one set of parameters are in some way correlated. For example, the correlation of parameters may be defined based on a process binning plan and/or design constraints of the semiconductor product (e.g., OCV/voltage, process/temperature, OCV/process, temperature ageing affects, etc.). More specifically, the defining of the at least two correlated parameters of the semiconductor product may depend on how a process binning plan is constructed (e.g., whether voltage bins will be used) and how the semiconductor product is being put together (e.g., layout of semiconductor product including proximity of devices thereon, the number of voltage regulators used, whether there is voltage step logic, etc.). Although aspects of the present invention are discussed herein with respect to one pair of correlated or balanced parameters, it should be understood that any number or combination of parameters may be used without departing from the spirit and scope of the present invention.

At step 230, individual wafers may be manufactured based on customer design constraints. The individual wafers may be manufactured to comprise a number of integrated circuits and microelectronic devices (e.g., a semiconductor product) built in and over the wafer through a number of microfabrication processes including doping, etching, deposition, and photolithographic patterning. In embodiments, the individual wafers may be diced into multiple dies, which are basically a small block of semiconductor material comprising a given fabricated functional circuit (e.g., a semiconductor product).

The dicing process may be accomplished by scribing and breaking, by mechanical sawing (normally with a machine called a dicing saw), or by laser cutting.

At step 235, each manufactured die may be tested and the performance of each die may be measured. In embodiments, the manufactured dies may comprise embedded devices similar to those placed in the test chip and/or a semiconductor product in step 205 (e.g., PSROs). The performance of each of the embedded devices may be measured to obtain an understanding of how the embedded devices behave across the manufactured dies. For example, a relationship may be established between performances of each of the embedded devices and a test site performance such that performance gradients across the manufactured dies summarize the affects of process variables, such as OCV, and process level densities on performance of the circuits within the manufactured dies. The testing and performance measurements provide a more precise measurement of the correlated and uncorrelated parameter components of the variation including the sensitivities thereof for each manufactured die.

At step 240, the dies may be timed using the more precise measurement of the correlated and uncorrelated parameter components including the sensitivities thereof. In embodiments, the timing of the dies may include assuming that clock cycle is given in extended canonical form, as shown in formula (1).

$$T_C = t_0 + a_0 \Delta X + a_1 \Delta Y + b_1 \Delta XY + \sum_{i=2}^{n} a_i \Delta Z_i + \sum_{i=2}^{m} b_i \Delta X \Delta Z_i + r \Delta R + c \Delta X \Delta R \quad (1)$$

where: $T_c$=clock cycle;
$T_0$=mean time;
$a_0 \Delta X$=default sensitivity to the second parameter of the at least one correlated set;
$a_1 \Delta Y$=default sensitivity to the first parameter of the at least one correlated set;
$b_1 \Delta XY$=default sensitivity to the second parameter and first parameter cross term;

$$\sum_{i=2}^{n} a_i \Delta Z_i \text{ and } \sum_{i=2}^{m} b_i \Delta X \Delta Z_i =$$

other default sensitivities that impact timing, and $r \Delta R + c \Delta X \Delta R$=first order and second order uncorrelated or random variation.

For the default sensitivity to the first parameter, the deviation from the original test models based upon the more precise measurement of the correlated and uncorrelated parameter components will drive the sensitivity to the second parameter from the default value in the extended canonical model of formula (1) to maintain a constant clock cycle $T_c$, as shown in formula (2).

$$a_1 \Delta Y \rightarrow a_{1\_New} \Delta Y, a_0 \Delta X \rightarrow a_{0\_New} \Delta X \text{ and } b_1 \Delta XY \rightarrow b_{1\_New} \Delta XY$$

where: $a_1 \Delta Y$=default sensitivity to the first parameter of the at least one correlated set;
$a_{1\_New} \Delta Y$=new sensitivity to the first parameter of the at least one correlated set;

$a_0 \Delta X$=default sensitivity to the second parameter of the at least one correlated set;

$a_{0\_New} \Delta X$=new sensitivity to the second parameter of the at least one correlated set;

$b_1 \Delta XY$=default sensitivity to the second parameter and first parameter cross term; and $b_{1\_New} \Delta XY$=new sensitivity to the second parameter and first parameter cross term.

The result is a new extended canonical model, as shown in formula (3).

$$T_C = t_0 + a_{0\_New} \Delta X + a_{1\_New} w \Delta Y + \\ b_{1\_New} \Delta XY + \sum_{i=2}^{n} a_i \Delta Z_i + \sum_{i=2}^{m} b_i \Delta X \Delta Z_i + r\Delta R + c\Delta X \Delta R \quad (3)$$

where: $T_c$=clock cycle;

$T_0$=mean time;

$a_{0\_New} \Delta X$=new sensitivity to the second parameter of the at least one correlated set;

$a_{1\_New} \Delta Y$=new sensitivity to the first parameter of the at least one correlated set;

$b_{1\_New} \Delta XY$=new sensitivity to the second parameter and first parameter cross term;

$\sum_{i=2}^{n} a_i \Delta Z_i$ and $\sum_{i=2}^{m} b_i \Delta X \Delta Z_i$ = other default senitivities that impact timing and $r\Delta R + c\Delta X \Delta R$=first order and second order uncorrelated or random variation.

As should be understood, the balancing of the sensitivities of the at least one set of correlated parameters includes the influence of the more precise measurement of the sensitivity to the first parameter being reflected in the sensitivity to the second parameter (e.g., timing degradation is shifted from the first parameter to the second parameter). Alternatively, it should be understood that the timing degradation may also be shifted from the voltage to the OVC, which results in a change in at least one manufacturing process for the semiconductor product. Advantageously, these aspects of the present invention may allow for lesser guard-banding and improved timing of new and existing semiconductor products.

In accordance with these aspects of the present invention, the systems and methods for closing timing of a semiconductor product by balancing sensitivities for at least one set of correlated or balanced parameters are hereafter discussed in detail as they pertain to the exemplary parameters of OCV/voltage and their use with respect to selective voltage binning (SVB). However, those of ordinary skill in the art should understand that the use of the systems and methods described herein with respect to OCV/voltage and SVB is illustrative of one exemplary use and that other parameters and uses (e.g., other process binning techniques) for the systems and methods described herein are contemplated by the invention, all of which achieve similar advantages and do not depart from the scope and spirit of the invention. Additionally, it should be understood that the systems and methods described herein may be performed using standard canonical models (e.g., first order models) and/or extended canonical models (e.g., second order models) all of which achieve similar advantages and do not depart from the scope and spirit of the invention.

In embodiments, performance of embedded devices on a test chip and/or semiconductor product may be measured during the design stages to achieve a better understanding of in-die performance variations resulting from OCV such as photo/etch interactions, chemical mechanical planarization (CMP) dishing and erosion, and other process interactions not observed with typical scribe region measurements. The OCV may be used to provide a forecast of timing that comprises two components including correlated or systematic variation and uncorrelated or random variation. The OCV will vary based on a particular product design and manufacturing processes used to fabricate the test chip or semiconductor product. Accordingly, it should be understood that if the OCV can be measured more precisely, then performance prediction can be modified to, for example, to avoid SVB field fails, lower power, enable pseudo-bin selection, reduce voltage, save power, and maintain clock performance.

Figure 3:
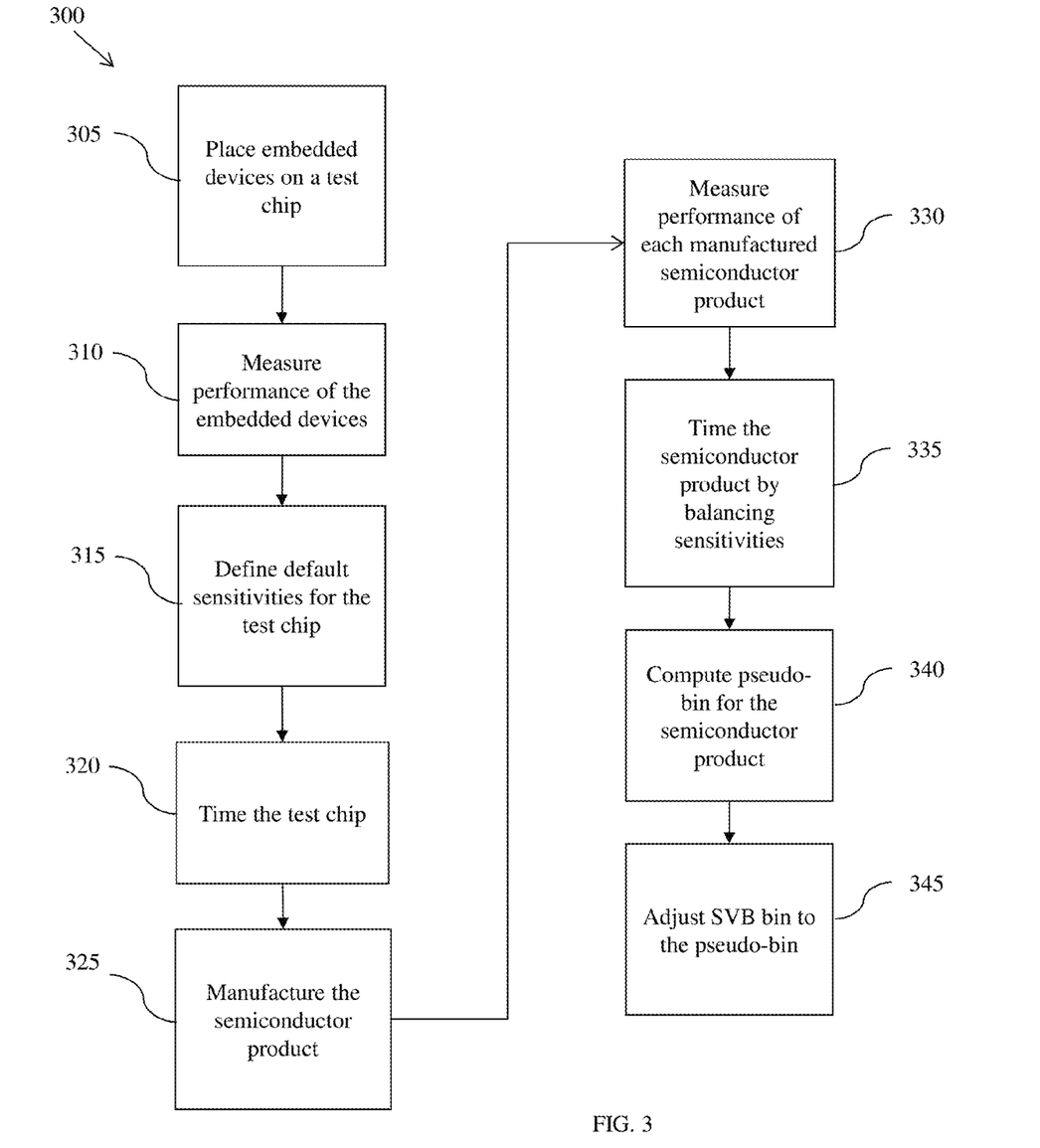

FIG. 3 depicts an exemplary flow for a process in accordance with aspects of the present invention. In embodiments, a process 300 is provided for closing timing of a semiconductor product by balancing sensitivities for OCV and voltage (i.e., a correlated pair of parameters), and the subsequent SVB of the semiconductor product.

At step 305, devices or functional patterns (e.g., embedded devices) are placed in a test chip and/or a semiconductor product (e.g., an IC chip). The embedded devices may be for example a hard macro placed as a regular structure across the test chip. In embodiments, the hard macro may represent PSROs that may be built into the test chip and/or the semiconductor product. In embodiments, a predetermined number of PSROs may be built across the test chip and/or the semiconductor product in many different configurations, e.g., a grid pattern.

At step 310, the performance of each of the embedded devices is measured to obtain an understanding of how the embedded devices behave across the test chip and/or the semiconductor product (e.g., OCV). In embodiments, a relationship may be established between performances of each of the embedded devices (e.g., PSROs) and a test site performance such that performance gradients across the test chip and/or the semiconductor product summarize the affects of the OCV, and process level densities on performance of the circuits within the test chip and/or the semiconductor product. As should be understood, the OCV is dependent on at least a die size for the test chip and/or the semiconductor product (e.g., the larger the die size of the test chip and/or the semiconductor product, the worse the OCV). Accordingly, in embodiments, the embedded devices are evaluated with respect to the largest allowable die or reticle available for the test chip and/or the semiconductor product.

At step 315, default sensitivities for the test chip and/or the semiconductor product may be defined based on the measured performances of the embedded devices in the test chip and/or the semiconductor product. In embodiments, different performance measurements of at least OCV and voltage from the multiple instances of the embedded devices on the same test chip and/or the semiconductor product are characterized to obtain an understanding or assumption of correlated and uncorrelated parameter components. The default sensitivities defined in the analysis may be recorded such that the default sensitivities can be retrieved if re-analysis or optimization is required at a later time, and checked to verify that the default sensitivities actually hold when the default sensitivities are used as a part of the design of product line chips.

At step 320, the test chip and/or the semiconductor product may be timed using the defined default sensitivities. In embodiments, the timing of the product may include closing timing of the semiconductor product using STA or SSTA. To model the effects of the variation, aspects of the present invention use the default sensitivities (e.g., timing degradation factors) during STA or SSTA to specify on a percentage basis the speeding up or slowing down of all or specific gates, nets, or both in the design of the semiconductor product. The total timing (e.g., delay) degradation is a sum of the uncorrelated and correlated variations on a per-cell or -net basis.

At step 325, individual wafers may be manufactured based on customer design constraints. The individual wafers may be manufactured to comprise a number of integrated circuits and microelectronic devices (e.g., a semiconductor product) built in and over the wafer through a number of microfabrication processes including doping, etching, deposition, and photolithographic patterning. In embodiments, the individual wafers may be diced into multiple dies, which are basically a small block of semiconductor material comprising a given fabricated functional circuit (e.g., a semiconductor product). The dicing process may be accomplished by scribing and breaking, by mechanical sawing (normally with a machine called a dicing saw), or by laser cutting.

At step 330, each manufactured die may be tested and the performance of each die may be measured. In embodiments, the manufactured dies may comprise embedded devices similar to those placed in the test chip and/or a semiconductor product in step 305 (e.g., PSROs). The performance of each of the embedded devices may be measured to obtain an understanding of how the embedded devices behave across the manufactured dies. The testing and performance measurements provide a more precise measurement of the correlated and uncorrelated parameter components of the OCV including the sensitivities thereof for each manufactured die. As should be understood, the measurements are more precise because the die size is now known and the semiconductor product is not manufactured at the largest die size allowable for the semiconductor product. Therefore, the OCV is not being measured at its worst process corner in step 330.

At step 335, the dies may be timed using the more precise measurement of the correlated and uncorrelated parameter components for OCV including the sensitivities thereof. In embodiments, the timing of the dies may include assuming that clock cycle is given in extended canonical form, as shown in formula (4).

$$T_C = t_0 + a_0 \Delta V + a_1 \Delta OCV + b_1 \Delta VOCV + \sum_{i=2}^{n} a_i \Delta X_i + \sum_{i=2}^{m} b_i \Delta V \Delta X_i + r\Delta R + c\Delta V \Delta R \quad (4)$$

where: $T_c$=clock cycle;
$T_0$=mean time;
$a_0 \Delta V$=default sensitivity to voltage;
$a_1 \Delta OCV$=default sensitivity to OCV;
$b_1 \Delta VOCV$=default sensitivity to voltage and OCV cross term;

$$\sum_{i=2}^{n} a_i \Delta X_i \text{ and } \sum_{i=2}^{m} b_i \Delta V \Delta X_i =$$

other default senitivities that impact timing and
$r\Delta R + c\Delta V \Delta R$=first order and second order uncorrelated or random variation.

For the default sensitivity to OCV, the deviation from the original test models based upon the more precise measurement of the correlated and uncorrelated parameter components will drive the sensitivity to voltage from the default value in the extended canonical model of formula (4) to maintain a constant clock cycle $T_c$, as shown in formula (5).

$$a_1 \Delta OCV \rightarrow a_{1\_New} \Delta OCV, a_0 \Delta V \rightarrow a_{0\_New} \Delta V \text{ and} \\ b_1 \Delta VOCV \rightarrow b_{1\_New} \Delta VOCV \quad (5)$$

where: $a_1 \Delta OCV$=default sensitivity to OCV;
$a_{1\_New} \Delta OCV$=new sensitivity to OCV;
$a_0 \Delta V$=default sensitivity to voltage;
$a_{0\_New} \Delta V$=new sensitivity to voltage;
$b_1 \Delta VOCV$=default sensitivity to voltage and OCV cross term; and
$b_{1\_New} \Delta VOCV$=new sensitivity to voltage and OCV cross term.

The result is a new extended canonical model, as shown in formula (6).

$$T_C = t_0 + a_{0\_New} \Delta V + a_{1\_New} w \Delta OCV + \\ b_{1\_New} \Delta VOCV + \sum_{i=2}^{n} a_i \Delta X_i + \sum_{i=2}^{m} b_i \Delta V \Delta X_i + r\Delta R + c\Delta V \Delta R \quad (6)$$

where: $T_c$=clock cycle;
$T_0$=mean time;
$a_{0\_New} \Delta V$=new sensitivity to the first parameter of the at least one correlated set;
$a_{1\_New} \Delta OCV$=new sensitivity to the second parameter of the at least one correlated set;
$b_{1\_New} \Delta VOCV$=new sensitivity to the first parameter and second parameter cross term;

$$\sum_{i=2}^{n} a_i \Delta X_i \text{ and } \sum_{i=2}^{m} b_i \Delta V \Delta X_i =$$

other default sensitivities that impact timing and
$r\Delta R + c\Delta V \Delta R$=first order and second order uncorrelated or random variation.

As should be understood, the balancing of the sensitivities of OCV and voltage includes the influence of the more precise measurement of the sensitivity to OCV being reflected in the sensitivity to voltage (e.g., timing degradation is shifted from OCV to voltage). Alternatively, it should be understood that the timing degradation may also be shifted from the voltage to the OVC, which results in a change in at least one manufacturing process for the semiconductor product. Advantageously, these aspects of the present invention may allow for lesser guard-banding and improved timing of new and existing semiconductor products.

At step 340, the new extended canonical model may be used to compute a pseudo-bin for each fabricated semiconductor product. In embodiments, the new extended canonical model may be projected to a process space, and the result thereof will be a lower voltage, which is equivalent to a shift in bins for SVB.

SVB is used widely in the semiconductor industry for minimizing power consumption of integrated chips while optimizing supply voltage across a predetermined process space. SVB depends upon the semiconductor products being divided into groups (bins) and each group is assigned its individual process space. During manufacture of the semiconductor product, the individual process space is burned into the semiconductor product using an electronic chip identifier (ECID) such that each semiconductor product knows the process space under which it falls. Therefore, for example, if the semiconductor product knows it falls under a slow process space, the semiconductor product can set its supply voltage high using a voltage regulator, or alternatively, if the semiconductor product knows it falls under a fast process space, the semiconductor product can set its supply voltage low using the voltage regulator. In any event, the purpose of the SVB is for the semiconductor product to be configured to set its supply voltage to minimize leakage based on its assigned process space. Thus, the SVB bin or process space that is shifted to using the new extended canonical model may be computed as the pseudo-bin for the fabricated semiconductor product.

At step 345, the SVB bin or process space for the product is adjusted to the new pseudo-bin calculated for the semiconductor product. In embodiments, this may include reprogramming the ECID for the semiconductor product to the new pseudo-bin or process space.

Figure 4:
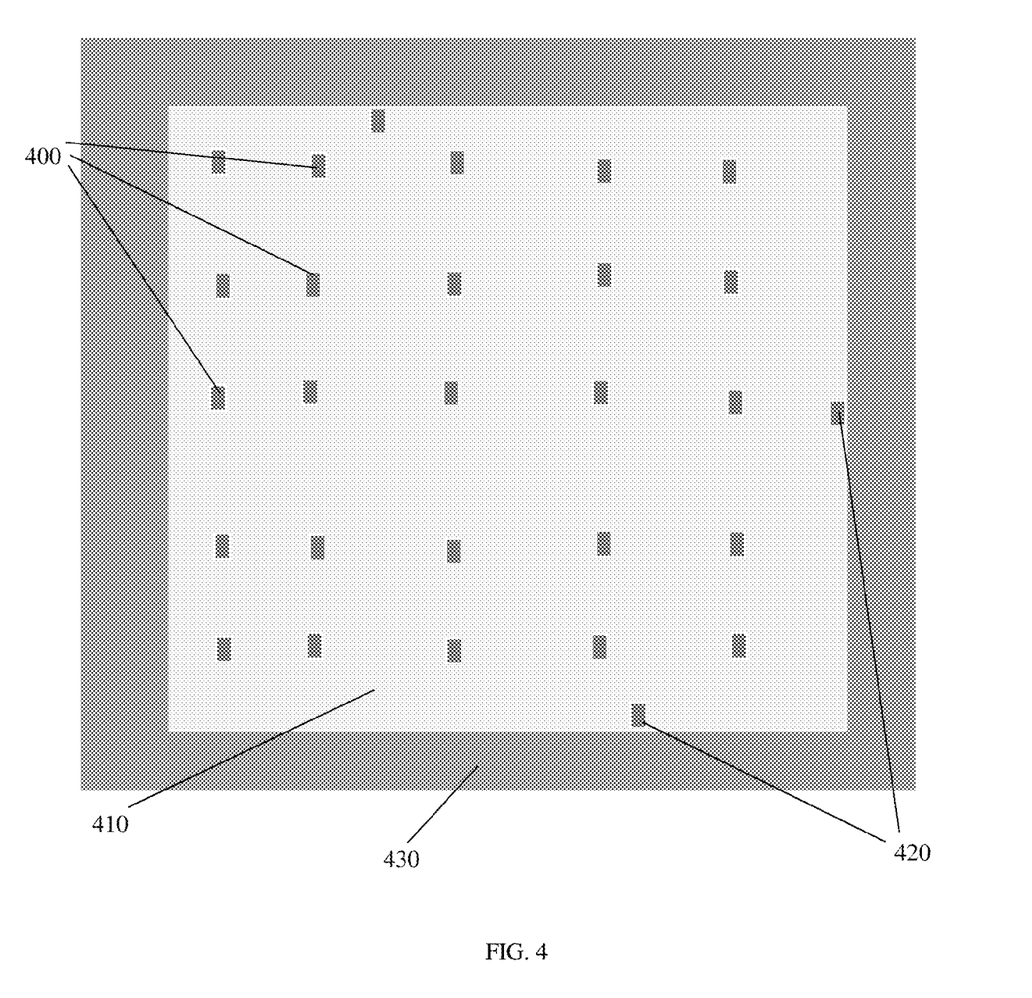
FIG. 4 is an exemplary layout scheme of embedded devices within a semiconductor product in accordance with aspects of the invention.

As shown in FIG. 4, a predetermined number (e.g., 25) of the PSROs 400 may be built across the test chip or semiconductor product 410 in different configurations. For example, the PSROs 400 may be placed across the chip 410 in substantially a grid type format (e.g., with a predetermined periodicity). In embodiments, the layout of the PSROs 400 across the chip 410 may also comprise some outlying PSROs 420 near the reticle 430 of the chip 410 depending on the placement of active regions of the chip 410.

In embodiments, the PSROs may be server based logic designs comprising inverters with a predetermined number (e.g., 51) of stages per ring. The PSROs may comprise substantially similar structure or may vary in structure, e.g., a first PSRO may comprise nFET half latches and a second PSRO may comprise pFET half latches. Each of the PSROs on the chips are connected through a design system wrapper that permits querying or probing of each PSRO across the chip. For example, each of the PSROs is configured to be connectable to the computation tool 100 (as discussed above with respect to FIG. 1) such that the performance of each of the PSROs can be measured.

Figure 5:
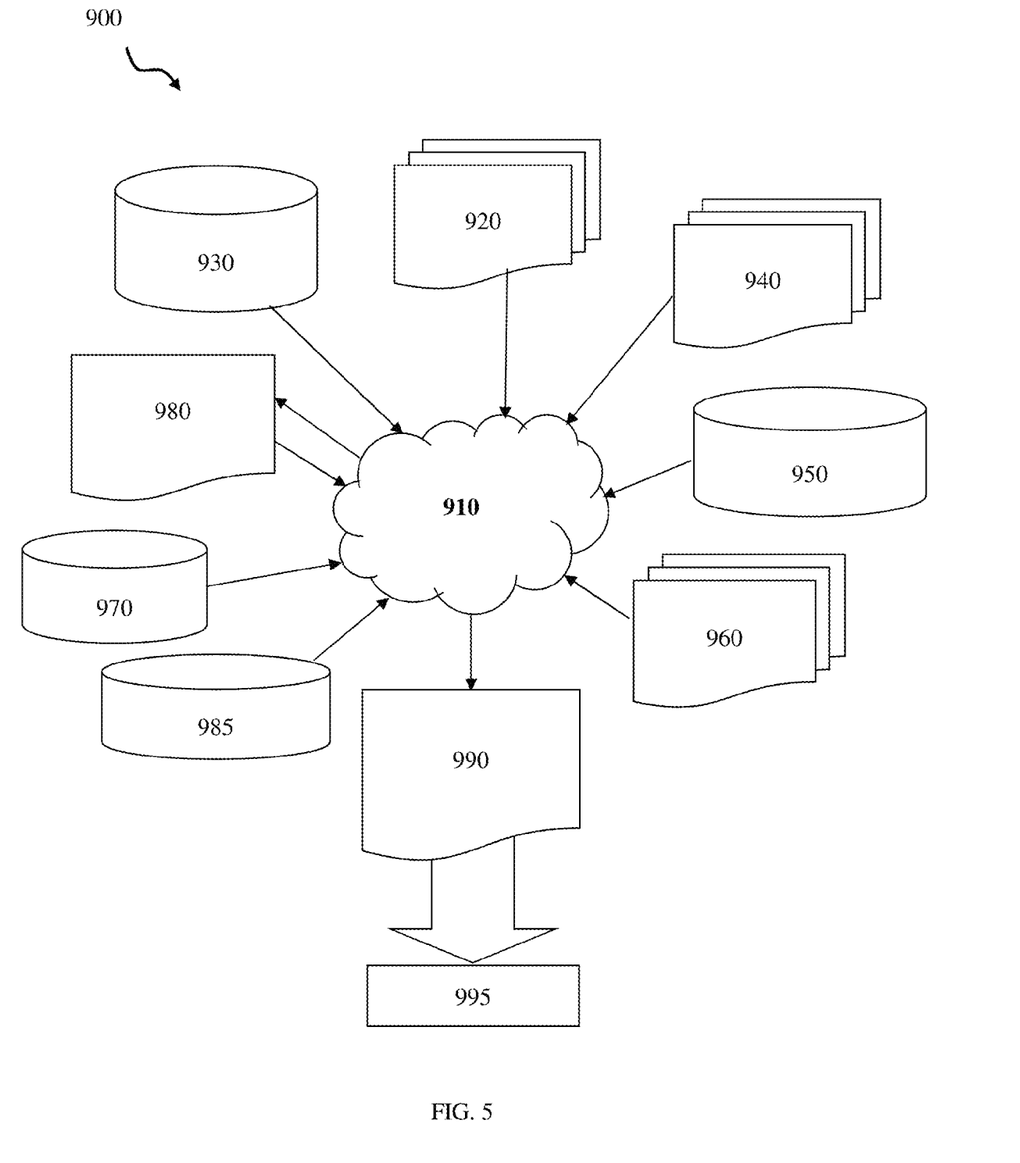
FIG. 5 is a flow diagram of a design process used in semiconductor design, manufacture, and/or test.

FIG. 5 is a flow diagram of a design process used in semiconductor design, manufacture, and/or test used with the system and method of the present invention. FIG. 5 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system, which can be implemented with the method and system of the present invention. As such, design structure 920 may comprise files or other data structures including human and/or machine-readable source code, compiled structures, and computer-executable code structures that when processed by a design or simulation data processing system functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 that may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more devices. In one embodiment, design structure 990 may comprise a compiled, executable HDL simulation model that functionally simulates the devices.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions operable to:
   define at least one set of correlated parameters for a semiconductor product, the at least one set of correlated parameters comprising a first parameter and a second parameter;
   measure performance of embedded devices within the semiconductor product; and
   close timing of the semiconductor product using the measured performance of the semiconductor product,
   wherein the closing the timing of the semiconductor product comprises calculating a sensitivity to the first parameter based on the measured performance of the embedded devices within the semiconductor product and balancing the sensitivity to the first parameter with a sensitivity to a second parameter such that timing degradation is shifted from the first parameter to the second parameter.

2. The method of claim 1, wherein the programming instructions are further operable to:
   measure performance of the embedded devices within a test chip for the semiconductor product;
   set default sensitivities to the first parameter and the second parameter for the test chip; and
   close timing of the test chip using the set default sensitivities.

3. The method of claim 2, wherein the closing the timing of the test chip comprises generating an extended canonical model comprising the set default sensitivities.

4. The method of claim 3, wherein the programming instructions are further operable to place the embedded devices on the test chip.

5. The method of claim 4, wherein:
   the closing the timing of the semiconductor product further comprises generating a new extended canonical model comprising the sensitivity to the first parameter and the sensitivity to the second parameter; and
   at least the sensitivity to the first parameter or the sensitivity to the second parameter is different from the set default sensitivities such that the new extended canonical model is different from the extended canonical model of the test chip.

6. The method of claim 5, wherein the first parameter is on-chip variation and the second parameter is voltage.

7. The method of claim 6, wherein the embedded devices are performance screen ring oscillators.

8. A method comprising:
   measuring performance of embedded devices within a semiconductor product;
   closing timing of the semiconductor product using the measured performance of the semiconductor product, wherein the closing the timing of the semiconductor product comprises:
      generating a new extended canonical model comprising a sensitivity to a first parameter and a sensitivity to a second parameter that are calculated based on the measured performance of the embedded devices within the semiconductor product; and
      balancing the sensitivity to the first parameter with the sensitivity to the second parameter within the new extended canonical model such that timing degradation is shifted from the first parameter to the second parameter;
   using the new extended canonical model to compute a pseudo-bin for the semiconductor product; and
   adjusting a processing bin for the semiconductor product to the pseudo-bin.

9. The method of claim 8, wherein the computing the pseudo-bin comprises projecting the new extended canonical model to a process space, which is a shifted process space from the processing bin for the semiconductor product.

10. The method of claim 9, wherein the adjusting the processing bin for the semiconductor product comprises reprogramming an electronic chip identifier of the semiconductor product to the pseudo-bin such that the semiconductor product knows the process space under which it falls.

11. The method of claim 10, wherein:
   the first parameter is on-chip variation and the second parameter is voltage; and
   the processing bin is from a selective voltage binning process.

12. The method of claim 11, wherein the timing degradation is shifted from the on-chip variation to the voltage, which results in a lower voltage being obtained for the semiconductor product.

13. The method of claim 11, wherein the timing degradation is shifted from the voltage to the on-chip variation, which results in a change in at least one manufacturing process for the semiconductor product.

14. A computer program product comprising a computer readable storage medium having program instructions embodied therewith, the program instructions executable by at least one processor to cause the at least one processor to:
   measure performance of embedded devices within a semiconductor product; and
   close timing of the semiconductor product using the measured performance of the semiconductor product, wherein the closing the timing of the semiconductor product comprises calculating a sensitivity to a first parameter based on the measured performance of the embedded devices within the semiconductor product and balancing the sensitivity to the first parameter with a sensitivity to a second parameter such that timing degradation is shifted from the first parameter to the second parameter.

15. The computer program product of claim 14, wherein the closing the timing of the semiconductor product further comprises generating a new extended canonical model comprising the sensitivity to the first parameter and the sensitivity to the second parameter.

16. The computer program product of claim 15, wherein the at least one processor is further operable to:
   use the new extended canonical model to compute a pseudo-bin for the semiconductor product; and
   adjust a processing bin for the semiconductor product to the pseudo-bin.

17. The computer program product of claim 16, wherein the computing the pseudo-bin comprises projecting the new extended canonical model to a process space, which is a shifted process space from the processing bin for the semiconductor product.

18. The computer program product of claim 17, wherein the first parameter is on-chip variation and the second parameter is voltage.

19. The computer program product of claim 18, wherein the timing degradation is shifted from the on-chip variation to the voltage, which results in a lower voltage being obtained for the semiconductor product.

20. The computer program product of claim 19, wherein the embedded devices are performance screen ring oscillators.

* * * * *